J. G. ILS,
Assignor to the RICHMOND STOVE CO.
Slop-Hopper.
No. 8,681. Reissued April 22, 1879.
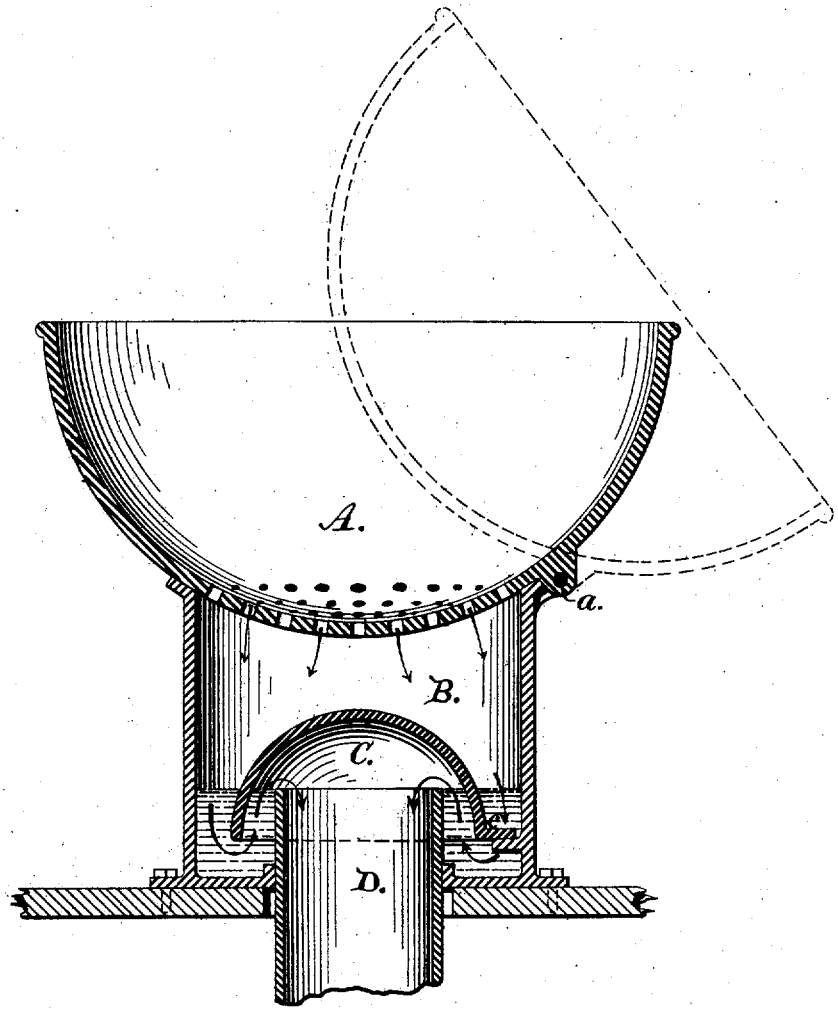
WITNESSES:
Chas. G. Calder
William L. Cook.
INVENTOR:
John G. Ils
by Joseph A. Miller
Attorney
N. PETERS, PHOTO-LITHOGRAPHER, WASHINGTON, D. C.

UNITED STATES PATENT OFFICE.

JOHN G. ILS, OF SAN FRANCISCO, CALIFORNIA, ASSIGNOR TO THE RICHMOND STOVE COMPANY, OF NORWICH, CONNECTICUT.

IMPROVEMENT IN SLOP-HOPPERS.

Specification forming part of Letters Patent No. 117,635, dated August 1, 1871; Reissue No. 8,681, dated April 22, 1879; application filed December 31, 1878.

*To all whom it may concern:*

Be it known that I, JOHN G. ILS, of the city and county of San Francisco, and State of California, have made a new and valuable Improvement in Slop-Hoppers; and I hereby declare that the following is a full, clear, and exact description of the same, reference being had to the accompanying drawing, forming part of this specification.

This invention has reference to an improvement in slop-hoppers or similar vessels arranged to receive slops, rubbish, dish-water, or other similar matter, and to drain the fluid from the same, so as to retain the solid matter and prevent the stopping of the discharge-pipes or stench-traps; and it particularly refers to the arrangement of the trap and the strainer.

The drawing represents the trap with the strainer in connection with a hopper or receiving-vessel, and also the hinge by which the strainer is connected with the receiving-vessel, so that the strainer can be raised and the trap cleaned. The whole forms a sink to receive dirty water and carry off the liquid, while the solid matter is retained by the perforated strainer.

The sink or hopper consists of two main parts—the trap-chamber B and the strainer A, resting upon it and movable. The trap-chamber is as small as the proper operation of the trap will allow without interfering with the free flow of the liquid through the trap.

The trap consists of the pipe D and cap C. The cap may be of any suitable shape, provided its lower edge will be below the upper end of the pipe D, so as to form a water-seal around the pipe, and prevent the gases from the drain or sewer entering through the trap. The pipe D should, therefore, extend twice the distance above the bottom of the chamber B that the lower edge of the cap C is above the said bottom, so that sufficient water is retained to make an efficient seal, and the passage of the water is not obstructed. I prefer to give to the upper portion of the cap C a convex form, so as to prevent the lodging of impurities on the same.

The cap C may be secured within the trap-chamber in any suitable manner, or it may be loosely resting within the same on some projections. I prefer to provide it with one or more arms, by which it may be secured within the trap-chamber, so as to be concentric with the outlet D, and leave a similar space between the outlet-pipe and the cap. The cap may also be secured to the pipe D in any suitable manner; but I prefer that it should be secured to prevent its being raised, so as to allow filth or coarse matter to enter the pipe D and endanger the stopping of the same, and thus destroy the use of the sink.

The strainer A is of such size as the quantity of rubbish and the convenience in use demand, and is secured to the trap-chamber, so that it can be easily raised, when required, preferably by a hinge. The strainer will thus be kept in its place.

The receiving-vessel or hopper may be arranged to tilt on the hinge, so that the residue may be readily discharged into a pail or tub; or the whole receiving-vessel may be made detachable from the trap-chamber, or one of these from the other, and a bail, a lug, or a handle may be arranged, by which the hopper can be removed.

A sink-connection is thus produced, into which slop, kitchen-offal, or other matter may be poured or placed, so as to drain off the liquid portion into a sink or drain without endangering the stopping of the pipe or the entrance of the foul gases from the sink-drain or sewer into the apartment where the same is placed, the trap of which can be readily examined by raising the perforated strainer, and when stopped by any matter that has passed through the strainer can be readily cleansed.

Having thus described my invention, I claim as new and desire to secure by Letters Patent—

1. The combination, with a hinged hopper provided with a strainer, of a discharge-pipe having an annular space encircling its upper end, and an inverted cap or cup located over the upper end of the discharge-pipe, the depending edge of said cap or cup extending down into the annular space about the discharge-pipe, and thereby forming a water-seal, substantially as set forth.

2. The combination, with a trap-chamber, of a hinged strainer, substantially as set forth.

3. The combination, with a vessel for straining slop or rubbish, and provided with a perforated strainer, of the trap-chamber B, pipe D, and inverted cap C, arranged to discharge the liquid and prevent the entrance of stench or smells, substantially as and for the purpose set forth.

4. The combination, with a trap-chamber, of a hopper provided with a perforated bottom, said hopper being hinged to the trap-chamber, substantially as set forth.

In witness that I claim the above as my invention I have hereunto affixed my name in presence of two witnesses.

JOHN G. ILS.

Witnesses:
E. V. SUTTER,
C. T. STANLEY.